(12) United States Patent
Aoki et al.

(10) Patent No.: US 12,504,305 B2
(45) Date of Patent: Dec. 23, 2025

(54) CONVEYANCE DEVICE AND SLIDER POSITION DETECTING DEVICE

(71) Applicant: YAMAHA HATSUDOKI KABUSHIKI KAISHA, Iwata (JP)

(72) Inventors: Shunsuke Aoki, Iwata (JP); Yoshinori Hayashi, Iwata (JP); Hideaki Kouda, Iwata (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 453 days.

(21) Appl. No.: 18/005,182

(22) PCT Filed: Jul. 29, 2020

(86) PCT No.: PCT/JP2020/028982
§ 371 (c)(1),
(2) Date: Jan. 11, 2023

(87) PCT Pub. No.: WO2022/024240
PCT Pub. Date: Feb. 3, 2022

(65) Prior Publication Data
US 2023/0341244 A1  Oct. 26, 2023

(51) Int. Cl.
*G01D 5/245* (2006.01)
(52) U.S. Cl.
CPC .................. *G01D 5/2452* (2013.01)
(58) Field of Classification Search
CPC .... B65G 54/02; G01D 5/2451; G01D 5/2452; G01D 5/2454; G01D 2205/18; G01D 2205/40
See application file for complete search history.

(56) References Cited

U.S. PATENT DOCUMENTS

| | | | | |
|---|---|---|---|---|
| 4,800,818 A | * | 1/1989 | Kawaguchi | B23Q 7/1436 104/292 |
| 6,191,507 B1 | * | 2/2001 | Peltier | B65G 54/02 318/135 |
| 9,099,127 B1 | | 8/2015 | Shintani et al. | |

(Continued)

FOREIGN PATENT DOCUMENTS

| | | |
|---|---|---|
| CN | 101358859 A | 2/2009 |
| CN | 101395450 A | 3/2009 |

(Continued)

OTHER PUBLICATIONS

International Search Report issued in PCT/JP2020/028982; mailed Sep. 24, 2020.

(Continued)

*Primary Examiner* — Joseph C Rodriguez
(74) *Attorney, Agent, or Firm* — Studebaker Brackett PLLC

(57) ABSTRACT

A conveyance device includes a slider, a conveyance unit, a magnetic scale for detecting a position of the slider, and a magnetic sensor for detecting magnetism of the magnetic scale. The magnetic scale includes a plurality of tracks arranged in parallel, and magnetization start positions and magnetization end positions of some tracks of the plurality of tracks are shifted to a side opposite to an end portion of the track from magnetization start positions and magnetization end positions of the other tracks.

14 Claims, 4 Drawing Sheets

(56) References Cited

U.S. PATENT DOCUMENTS

| | | | |
|---|---|---|---|
| 11,738,954 B2* | 8/2023 | Kusunoki | B65G 43/08 |
| | | | 198/619 |
| 12,203,778 B2* | 1/2025 | Tatei | G01D 5/145 |
| 2006/0012922 A1 | 1/2006 | Shoji | |
| 2011/0068731 A1 | 3/2011 | Yoshida et al. | |
| 2014/0320058 A1* | 10/2014 | Takagi | H02K 41/031 |
| | | | 318/632 |
| 2015/0061414 A1* | 3/2015 | Urata | H02K 41/031 |
| | | | 310/12.11 |
| 2015/0077092 A1 | 3/2015 | Kogej et al. | |
| 2019/0190366 A1* | 6/2019 | Urata | H02K 41/03 |
| 2019/0193942 A1* | 6/2019 | Hayashi | G01D 5/2451 |
| 2021/0148732 A1* | 5/2021 | Kadoguchi | B65G 43/00 |

FOREIGN PATENT DOCUMENTS

| | | |
|---|---|---|
| CN | 101419049 A | 4/2009 |
| CN | 101421589 A | 4/2009 |
| CN | 105277108 A | 1/2016 |
| CN | 105911490 A | 8/2016 |
| CN | 108351226 A | 7/2018 |
| CN | 109716063 A | 5/2019 |
| DE | 10 2009 026 429 A1 | 11/2010 |
| JP | S61-17002 A | 1/1986 |
| JP | H04-130218 A | 5/1992 |
| JP | 2002-228485 A | 8/2002 |
| JP | 2006-170790 A | 6/2006 |
| JP | 2008-116382 A | 5/2008 |
| JP | 2010-057280 A | 3/2010 |
| JP | 2011-064608 A | 3/2011 |
| JP | 2015-190880 A | 11/2015 |
| JP | 2016-217754 A | 12/2016 |
| JP | 2019-143991 A | 8/2019 |
| JP | 2019-160991 A | 9/2019 |
| WO | 2009/122693 A1 | 10/2009 |
| WO | 2018/055755 A1 | 3/2018 |

OTHER PUBLICATIONS

Written Opinion issued in PCT/JP2020/028982; mailed Sep. 24, 2020.

An Office Action; "Notice of Reasons for Refusal," mailed by the Japanese Patent Office on Sep. 26, 2023, which corresponds to Japanese Patent Application No. 2022-539851 and is related to U.S. Appl. No. 18/005,182; with English language translation.

An Office Action; mailed by the China National Intellectual Property of the People's Republic of China on Mar. 3, 2025, which corresponds to Chinese Patent Application No. 202080102568.8 and is related to U.S. Appl. No. 18/005,182.

An Office Action mailed by China National Intellectual Property Administration on Oct. 9, 2025, which corresponds to Chinese Patent Application No. 202080102568.8 and is related to U.S. Appl. No. 18/005,182.

* cited by examiner

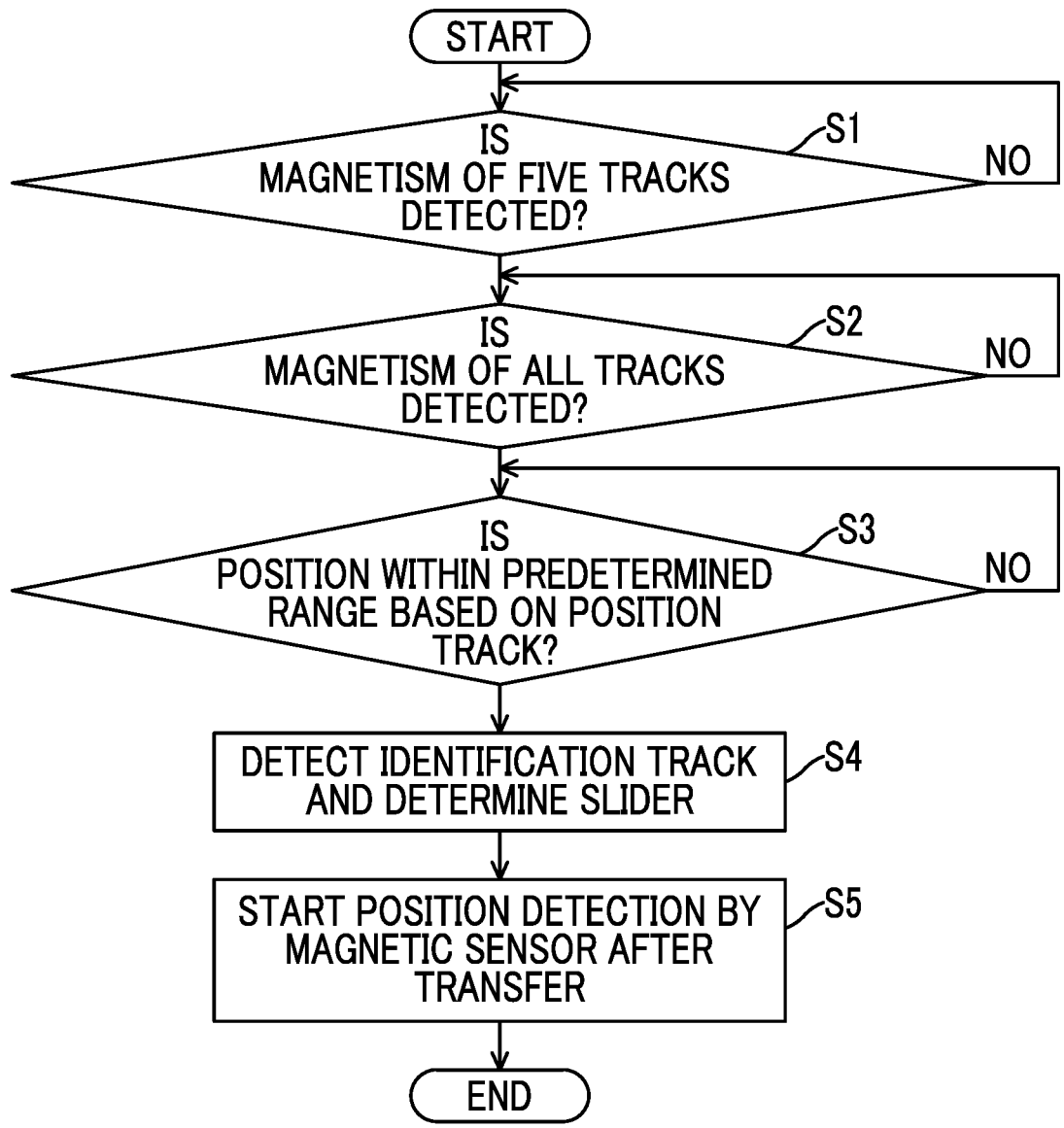

CONVEYANCE DEVICE AND SLIDER POSITION DETECTING DEVICE

CROSS-REFERENCE TO RELATED APPLICATION

This application is a National Stage of International Patent Application No. PCT/JP2020/028982, filed Jul. 29, 2020, the entire content of which is incorporated herein by reference.

BACKGROUND

Technical Field

The present disclosure relates to a conveyance device and a slider position detecting device, and more particularly to a conveyance device having a slider and a position detecting device of a conveyed slider.

Background Art

In the related art, a position detecting device for a conveyed slider is known. This position detection is disclosed, for example, in JP-A-2019-160991.

In JP-A-2019-160991, a position detecting device (slider position detecting device) is disclosed, which includes a magnetic scale that is provided to extend along a predetermined direction in a slider moving along a predetermined direction and detects a position of the slider, and a magnetic sensor that is provided in a conveyance unit that moves the slider along a predetermined direction and detects magnetism of the magnetic scale. In the position detecting device disclosed in JP-A-2019-160991, the magnetic scale includes a plurality (six) of tracks arranged in parallel, and each of the plurality of tracks is magnetized with magnetic information along a predetermined direction by a magnetizing device.

SUMMARY

Here, although not described in JP-A-2019-160991, in the vicinity of both end portions of the track of the magnetic scale, the magnetic information is not stable (there is magnetic disturbance and is not stable), and thus, it is known that information accuracy of the magnetic information near both end portions of the magnetic scale is not high. Therefore, in the conventional position detecting device such as that disclosed in JP-A-2019-160991, in some cases, the position of the slider cannot be accurately detected due to the use of magnetic information with low information accuracy near both end portions of the magnetic scale. Therefore, there is a demand for a conveyance device and a slider position detecting device that can accurately detect the position of the slider.

Accordingly, the present disclosure provides a conveyance device and a slider position detecting device that can accurately detect the position of the slider.

According to a first aspect of the present disclosure, there is provided a conveyance device including a slider; a conveyance unit that moves the slider along a predetermined direction; a magnetic scale that is provided in the slider to extend along the predetermined direction and detects a position of the slider; and a magnetic sensor that is provided in the conveyance unit and detects magnetism of the magnetic scale, in which the magnetic scale includes a plurality of tracks arranged in parallel along a direction perpendicular to the predetermined direction. Magnetization start positions and magnetization end positions of some of the plurality of tracks are shifted to a side opposite to an end portion of the track from magnetization start positions and magnetization end positions of the other tracks.

In the conveyance device according to the first aspect of the present disclosure, as described above, the magnetization start positions and the magnetization end positions of some of the plurality of tracks are shifted to the side opposite to the end portion of the track from the magnetization start positions and the magnetization end positions of the other tracks. As a result, when the magnetic sensor does not detect the magnetism of all of the plurality of tracks of the magnetic scale, it can be determined that the magnetic scale is near the end portion. Accordingly, it is possible to detect magnetic information whose information accuracy is not high (magnetically disturbed and unstable) in the vicinity of the end portion of the magnetic scale and to suppress use of the magnetic information for position detection of the slider. In addition, when the magnetic sensor detects the magnetism of all of the plurality of tracks of the magnetic scale, the magnetic information of the other tracks except for the some of the tracks is magnetically stable. Accordingly, it is possible to determine whether or not the magnetic information of the some of the tracks is located to be magnetically stable using the magnetic information of the other tracks. This makes it possible to accurately determine a timing to start detecting the position of the slider. As a result, the position of the slider can be detected with high accuracy.

In the conveyance device according to the first aspect, preferably, each of the plurality of tracks includes a magnetically stable region in which magnetic information is magnetically stable, and a magnetically unstable region which is disposed outside both ends of the magnetically stable region and in which the magnetic information is magnetically unstable, and the magnetization start positions and the magnetization end positions of the some of the plurality of tracks are shifted to the side opposite to the end portion of the track from the magnetically unstable regions of the other tracks. With this configuration, when the magnetism of all of the plurality of tracks including the some of the plurality of tracks that are shifted to the side opposite to the end portion of the track is detected, the other tracks are the magnetically stable region. Therefore, magnetic information with high information accuracy can be detected from the other tracks based on detection of all of the plurality of tracks. As a result, it is possible to accurately determine whether or not the magnetic information of the some of the plurality of tracks is at the magnetically stable position by using the stable magnetic information of other tracks.

In this case, preferably, each of the plurality of tracks is configured such that the magnetism changes periodically, and the magnetization start positions and the magnetization end positions of the some of the plurality of tracks are shifted to the side opposite to the end portion of the track by one period or more from the magnetization start positions and the magnetization end positions of the other tracks. With this configuration, the magnetic information is magnetically stable at a position shifted to the side opposite to the end portion of the track by one period or more from the magnetization start or the magnetization end. Accordingly, when the magnetism of all of the plurality of tracks including the some of the plurality of tracks shifted to the side opposite to the end portion of the track is detected, the other tracks can be reliably made into the magnetically stable region.

In the conveyance device according to the first aspect, preferably, a plurality of the magnetic sensors are disposed along the predetermined direction, and a distance from the magnetization start positions to the magnetization end positions of the some of the plurality of tracks is greater than a distance between adjacent magnetic sensors. With this configuration, the magnetism of all of the plurality of tracks can be detected by any one magnetic sensor of the adjacent magnetic sensors. Accordingly, when the slider moves while transferring the plurality of magnetic sensors, the slider can be accurately detected at all positions.

In the conveyance device according to the first aspect, preferably, a magnetization start position and a magnetization end position of one track of the plurality of tracks are shifted to the side opposite to the end portion of the track from magnetization start positions and magnetization end positions of a plurality of other tracks of the plurality of tracks. With this configuration, it is possible to minimize the number of tracks in which the magnetization start position and the magnetization end position are shifted to the side opposite to the end portion of the track. Therefore, it is possible to increase the number of the plurality of other tracks in which the magnetic information is stabilized at a position close to the end portion of the magnetic scale.

In the conveyance device according to the first aspect, preferably, the magnetic scale includes an identification track having identification information for distinguishing a plurality of the sliders and a position track for specifying the position of the slider, and the some of the plurality of tracks of which the magnetization start positions and magnetization end positions are shifted to the side opposite to the end portion of the track are included in the identification track. With this configuration, when the magnetic sensor detects the magnetism of all of the plurality of tracks of the magnetic scale, the magnetic information of the position track for specifying the position of the slider is magnetically stable. Accordingly, it is possible to accurately determine whether or not the magnetic information of the some of the plurality of tracks is at a position where the magnetic information is magnetically stable using the stable magnetic information of the position track.

In the conveyance device according to the first aspect, preferably, the magnetic scale includes a first track on which predetermined magnetic information is periodically and repeatedly recorded, and a second track on which periodic information of the first track is recorded, and a magnetization start position and a magnetization end position of the second track are shifted to the side opposite to the end portion of the track from a magnetization start position and a magnetization end position of the first track. With this configuration, in the first track which requires more information accuracy than the second track in order to accurately detect the position of the slider, the magnetic information can be magnetically stable at a position close to the end portion of the magnetic scale.

In the conveyance device according to the first aspect, preferably, the conveyance device further includes a control unit that acquires the position of the slider based on a detection result of the magnetic sensor, a plurality of the magnetic sensors are disposed along the predetermined direction, and the control unit is configured to start control to acquire the position of the slider based on a detection result of one magnetic sensor, in a case where the position of the slider is acquired by detecting the magnetism of the magnetic scale with the other magnetic sensor, when magnetism of a magnetically stable region in which magnetic information of all tracks of the plurality of tracks of the magnetic scale is magnetically stable is detected by one magnetic sensor adjacent to the other magnetic sensor. With this configuration, it is possible to transfer from the other magnetic sensor to one magnetic sensor while the magnetic information of the track detected by one magnetic sensor is magnetically stable.

In this case, preferably, the control unit is configured to determine whether or not the track of the magnetic scale is the magnetically stable region in which the magnetic information of the track of the magnetic scale is magnetically stable based on presence or absence of the magnetism detected by the magnetic sensor. With this configuration, it is possible to determine the presence or absence of the detection of the magnetism even when the magnetic information is not stable, and thus, it is possible to accurately determine whether or not the track of the magnetic scale is the magnetically stable region.

In the configuration for determining whether or not the magnetic information of the track of the magnetic scale is the magnetically stable region having the stable magnetic information based on the presence or absence of the detection of the magnetism, preferably, the control unit is configured to determine that the other tracks of the plurality of tracks are the magnetically stable region when the magnetism of all the tracks of the plurality of tracks is detected. With this configuration, it is possible to accurately determine that the other tracks longer than the some of the plurality of tracks are magnetically stable regions.

In the configuration for determining whether or not the magnetic information of the track of the magnetic scale is the magnetically stable region having the stable magnetic information based on the presence or absence of the detection of the magnetism, preferably, the control unit is configured to determine whether or not the some of the plurality of tracks are the magnetically stable region based on the magnetic information of the other tracks when the other tracks of the plurality of tracks are the magnetically stable region. With this configuration, based on the magnetic information of the other tracks that have previously become the magnetically stable region, it is determined with high accuracy that the some of the plurality of tracks shorter than the other tracks have become the magnetically stable region.

According to a second aspect of the present disclosure, there is provided a slider position detecting device including a magnetic scale that is provided in a slider, which moves along a predetermined direction, to extend along the predetermined direction and detects a position of the slider; and a magnetic sensor that is provided in a conveyance unit that moves the slider along the predetermined direction and detects magnetism of the magnetic scale, in which the magnetic scale includes a plurality of tracks arranged in parallel along a direction perpendicular to the predetermined direction. Magnetization start positions and magnetization end positions of some of the plurality of tracks are shifted to a side opposite to an end portion of the track from magnetization start positions and magnetization end positions of the other tracks.

In the slider position detecting device according to the second aspect of the present disclosure, as described above, the magnetization start positions and the magnetization end positions of the some of the plurality of tracks are shifted to the side opposite to the end portion of the track from the magnetization start positions and the magnetization end positions of the other tracks. As a result, when the magnetic sensor does not detect the magnetism of all of the plurality of tracks of the magnetic scale, it can be determined that the magnetic scale is near the end portion. Accordingly, it is possible to detect magnetic information whose information accuracy is not high (unstable) in the vicinity of the end portion of the magnetic scale and to suppress use of the magnetic information for position detection of the slider. In addition, when the magnetic sensor detects the magnetism of all of the plurality of tracks of the magnetic scale, the magnetic information of the other tracks except for the some of the plurality of tracks is magnetically stable. Accordingly, it is possible to determine whether or not the magnetic information of the some of the plurality of tracks is located to be magnetically stable using the magnetic information of the other tracks. This makes it possible to accurately determine a timing to start detecting the position of the slider. As a result, it is possible to provide a slider position detecting device that can accurately detect the position of the slider.

According to the present disclosure, as described above, the position of the slider can be detected with high accuracy.

BRIEF DESCRIPTION OF THE DRAWINGS

FIG. 7 is a flowchart for explaining position detection start processing by a control unit of the conveyance device according to one embodiment of the present disclosure.

DETAILED DESCRIPTION

Embodiments of the present disclosure will be described below with reference to the drawings.

A configuration of a conveyance device 100 according to one embodiment of the present disclosure will be described with reference to FIGS. 1 to 7.

(Configuration of Conveyance Device)

The conveyance device 100 according to the present embodiment is configured to convey a conveyance target placed on sliders 30 along conveyance units 1 and 2. In addition, the conveyance target conveyed by the conveyance device 100 is subjected to operations at a plurality of conveyance positions. The conveyance target is operated by a robot or an operator.

Figure 1:
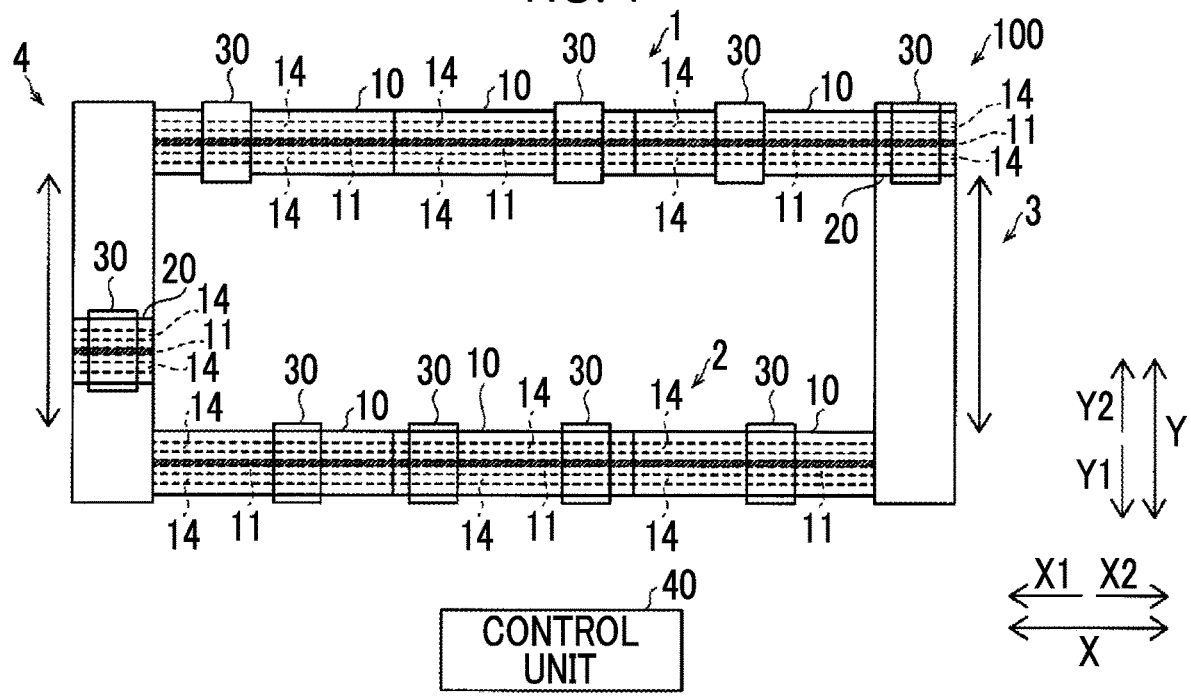
FIG. 1 is a plan view illustrating a conveyance device according to one embodiment of the present disclosure.

The conveyance device 100 includes the conveyance unit 1, the conveyance unit 2, a transfer conveyance unit 3, a transfer conveyance unit 4, and the sliders 30, as illustrated in FIG. 1. The conveyance device 100 also includes a control unit 40.

The conveyance unit 1 includes a plurality of conveyance modules 10. The conveyance unit 2 includes a plurality of conveyance modules 10. The plurality of conveyance modules 10 are connected in series to form a conveyance path for the slider 30. The slider 30 is conveyed in an X direction through the conveyance units 1 and 2, and conveyed in a Y direction from the conveyance unit 1(2) to the conveyance unit 2(1) by the transfer conveyance units 3 and 4. In other words, the slider 30 is conveyed in the order of the conveyance unit 1, the transfer conveyance unit 3, the conveyance unit 2, and the transfer conveyance unit 4, and is circulated for use.

Figure 2:
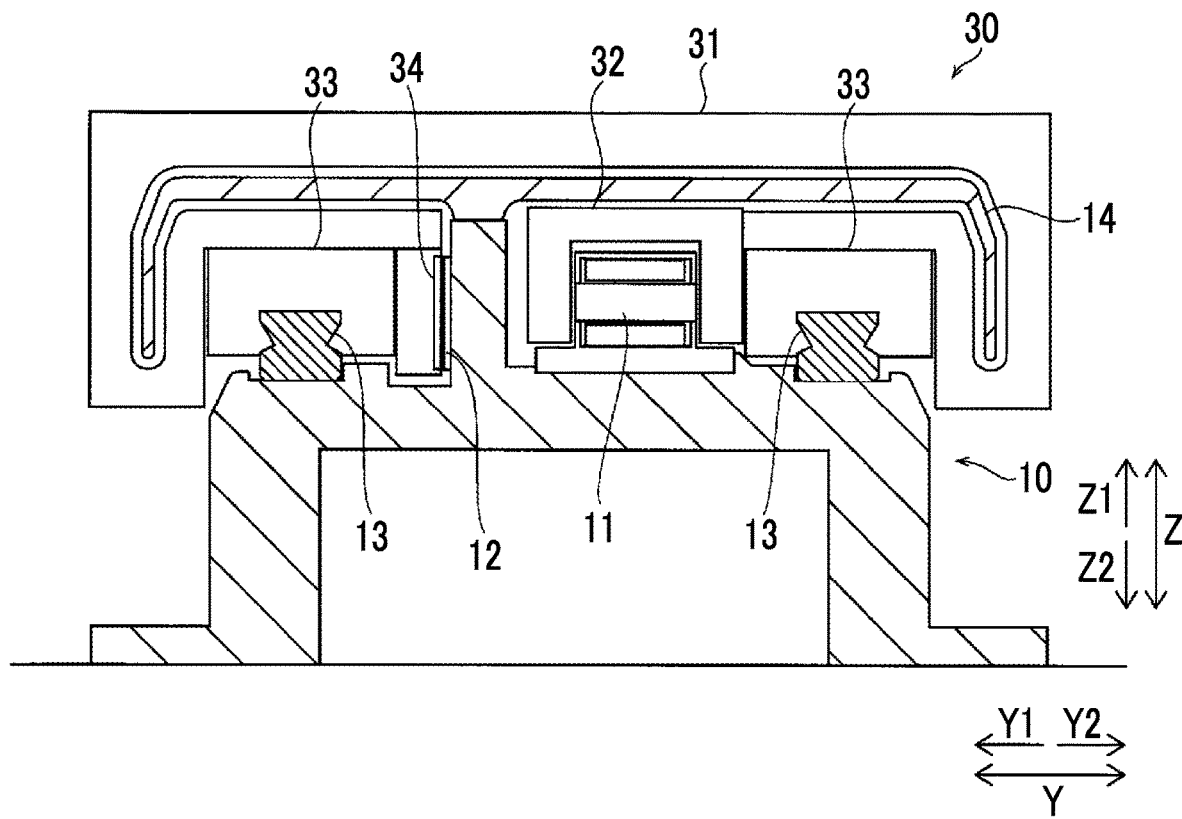
FIG. 2 is a cross-sectional view illustrating a conveyance unit and a slider of the conveyance device according to one embodiment of the present disclosure.

The conveyance module 10 includes a linear motor stator 11, a magnetic sensor 12, guide rails 13, and a cover 14, as illustrated in FIG. 2.

As illustrated in FIG. 1, the transfer conveyance units 3 and 4 include a conveyance mechanism 20 that conveys the slider 30 in the X direction and a moving mechanism that moves the conveyance mechanism 20 in the Y direction. The conveyance mechanism 20 has a linear motor stator 11 and a magnetic sensor 12. The moving mechanism has a guide rail and a ball screw mechanism.

The slider 30 includes a slider main body 31, a linear motor mover 32, a guide block 33, and a magnetic scale 34, as illustrated in FIG. 2. A plurality of the sliders 30 are provided. In addition, the plurality of sliders 30 are configured to move independently on the conveyance units 1 and 2 and the transfer conveyance units 3 and 4.

The conveyance units 1 and 2 are configured to move the slider 30 along a predetermined direction (X direction). Further, the conveyance units 1 and 2 are provided substantially parallel. The conveyance unit 1 conveys the slider 30 in an X2 direction, and the conveyance unit 2 conveys the slider 30 in an X1 direction. The conveyance units 1 and 2 are fixedly provided on a pedestal. That is, the linear motor stators 11 and the guide rails 13 of the conveyance units 1 and 2 are fixedly provided.

The transfer conveyance unit 3 is disposed at a position adjacent to sides of the conveyance units 1 and 2 in the X2 direction. In addition, the transfer conveyance unit 4 is disposed at a position adjacent to sides of the conveyance units 1 and 2 in the X1 direction.

The linear motor stator 11 includes an electromagnet, and moves the slider 30 by supplying drive power (current) to the electromagnet. The linear motor stator 11 is disposed along a conveyance direction (X direction). Further, as illustrated in FIG. 2, the electromagnet of the linear motor stator 11 is disposed such that a core extends along the Y direction.

The magnetic sensors 12 are provided in the conveyance units 1 and 2. Moreover, the magnetic sensor 12 is configured to detect magnetism of the magnetic scale 34. Specifically, the magnetic sensor 12 is provided to face the magnetic scale 34 provided in the slider 30 in the Y direction. The magnetic sensor 12 is configured to detect the magnetism of the magnetic scale 34 to detect the position of the slider 30. The position of the slider 30 detected by the magnetic sensor 12 is used for feedback control of movement of the slider 30.

Figure 5:
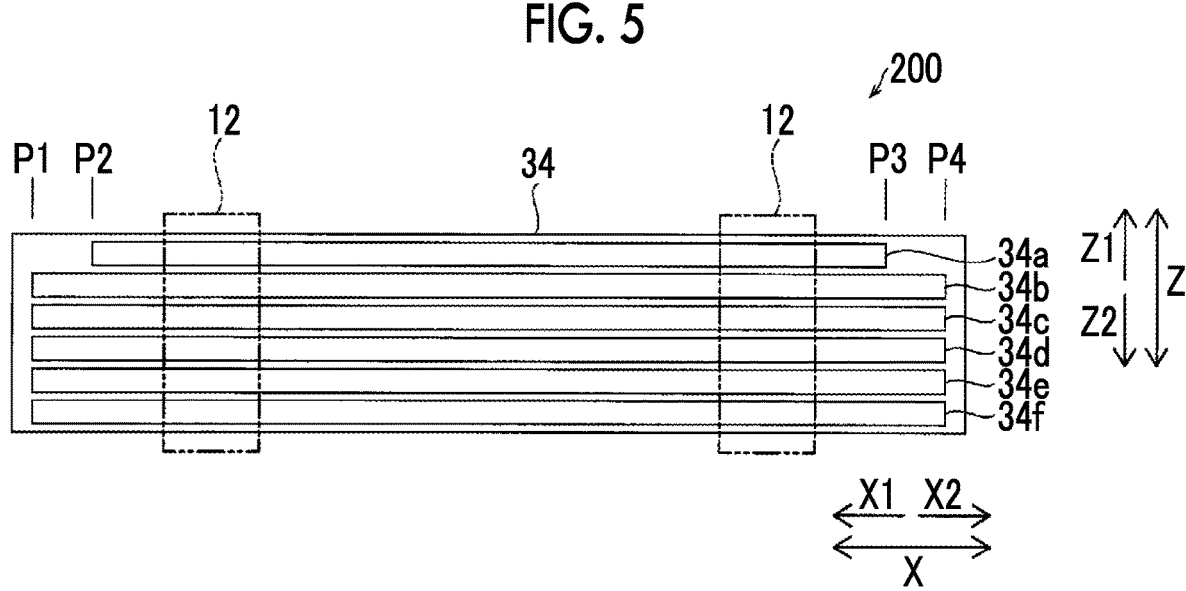
FIG. 5 is a view illustrating a relationship between the magnetic scale and a plurality of magnetic sensors of the conveyance device according to one embodiment of the present disclosure.

In addition, as illustrated in FIG. 5, a plurality of the magnetic sensors 12 are disposed at intervals along the conveyance direction (X direction). The magnetic sensor 12 is also configured to transmit a signal corresponding to the detected magnetism to the control unit 40.

The guide rail 13 is disposed to extend along the conveyance direction (X direction) of the slider 30. A pair of guide rails 13 are provided in parallel along the Y direction. The guide rails 13 are disposed to be arranged so that the sliders 30 can transfer between the conveyance modules 10 adjacent in the X direction. The guide block 33 of the slider 30 is engaged with the guide rail 13 to be movable in the X direction.

The cover 14 is provided to cover the linear motor stator 11, the magnetic sensor 12, and the guide rail 13 from above. That is, the cover 14 is provided so that upper portions of the linear motor stator 11, the magnetic sensor 12, and the guide rail 13 are not exposed even when the slider 30 is not present.

The slider main body 31 is configured so that the conveyance target is placed thereon. Further, the slider main body 31 is provided to surround the covers 14 of the conveyance units 1 and 2 when viewed from the conveyance direction (X direction). The linear motor mover 32, the guide block 33 and the magnetic scale 34 are attached to the slider main body 31.

The linear motor mover 32 is provided to sandwich the linear motor stator 11 in the Y direction. The linear motor mover 32 includes a plurality of permanent magnets arranged along the conveyance direction (X direction).

The guide block 33 is provided movably along the guide rail 13. The guide block 33 has a plurality of balls that move and circulate along the movement direction.

The magnetic scale 34 is provided in the slider 30 to extend along a predetermined direction (X direction). Moreover, the magnetic scale 34 is provided to detect the position (conveyance position) of the slider 30. In addition, the magnetic scale 34 is magnetized in a predetermined pattern along the conveyance direction (X direction). Further, as illustrated in FIG. 5, a position detecting device 200 includes the magnetic scale 34 and the magnetic sensor 12 that detects the magnetism of the magnetic scale 34. The position detecting device 200 is an example of a "slider position detecting device" in claims.

The magnetic scale 34 is formed by magnetizing a scale material according to a predetermined pattern. The scale material is made of a magnetic material (for example, metal magnet, plastic magnet, rubber magnet, or the like). The scale material is made of the same material and quality as a whole, and the presence or absence of a magnetic field, a width of a period, and strength of the magnetic field are controlled by magnetization. In addition, the magnetization of the scale material is performed while the scale material is attached to a back plate, which is a rigid body.

Figure 3:
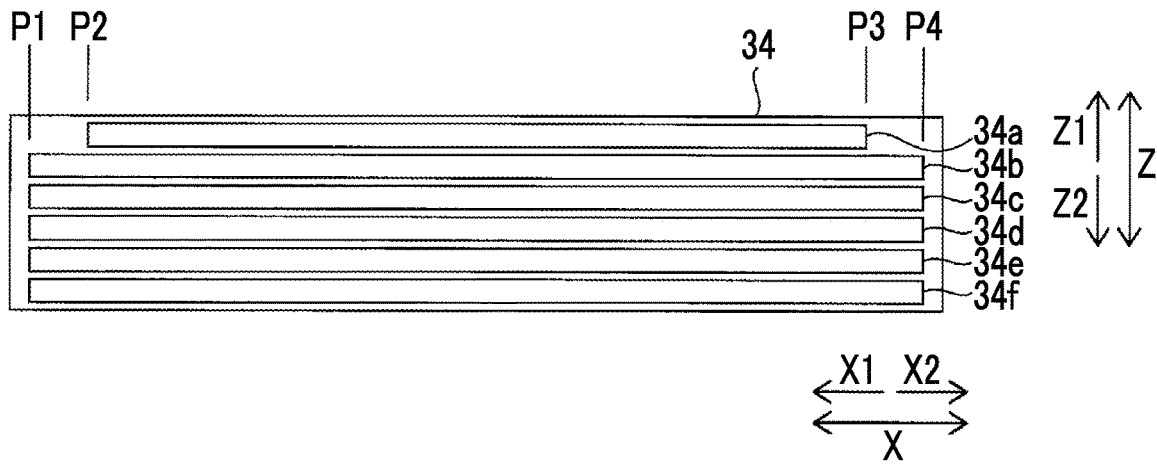
FIG. 3 is a view illustrating a magnetic scale of the conveyance device according to one embodiment of the present disclosure.

Here, in the present embodiment, as illustrated in FIG. 3, the magnetic scale 34 includes a plurality of tracks 34a, 34b, 34c, 34d, 34e, and 34f arranged in parallel along a direction (Z direction) perpendicular to a predetermined direction (X direction). Further, magnetization start positions P2 and magnetization end positions P3 of some tracks 34a of the plurality of tracks 34a to 34f are shifted (shifted to a center side of the track) toward a side opposite to an end portion of the track from magnetization start positions P1 and magnetization end positions P4 of the other tracks 34b to 34f. That is, the magnetization start position P2 is shifted in the X2 direction side from the magnetization start position P1. Moreover, the magnetization end position P3 is shifted in the X1 direction side from the magnetization end position P4.

Figure 4:
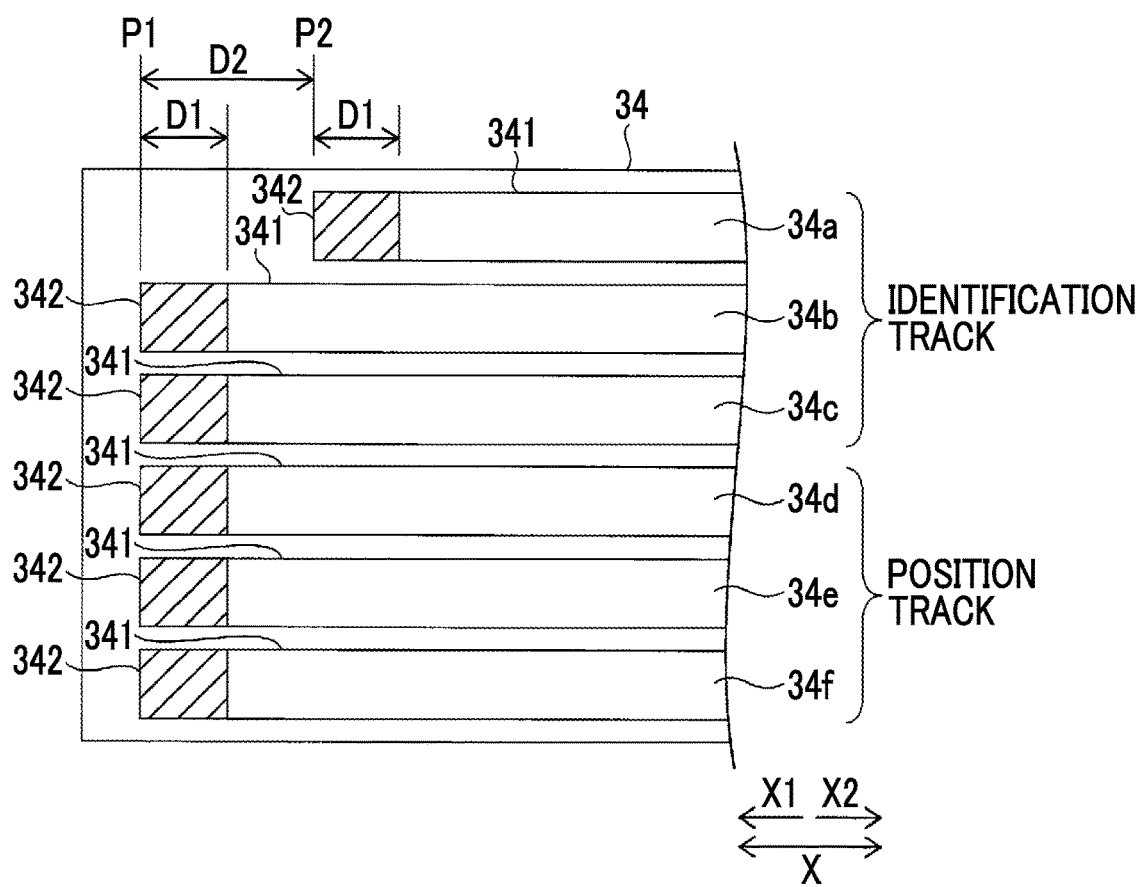
FIG. 4 is a view illustrating the vicinity of an end portion of the magnetic scale of the conveyance device according to one embodiment of the present disclosure.

Specifically, as illustrated in FIG. 4, each of the plurality of tracks 34a to 34f includes a magnetically stable region 341 in which magnetic information is stable, and a magnetically unstable region 342 which is disposed outside both ends of the magnetically stable region 341 and in which the magnetic information is magnetically unstable. In other words, there is magnetic disturbance in the vicinity of the magnetized end portion (magnetically unstable region 342). As a result, a phase difference is not constant among the plurality of tracks.

Moreover, the plurality of tracks 34a to 34f are configured such that the magnetism changes periodically. In addition, the magnetic scale 34 includes identification tracks (tracks 34a to 34c) having identification information for distinguishing the plurality of sliders 30 and position tracks (34d to 34f) for specifying the positions of the sliders 30. That is, it is possible to specify which slider 30 among the plurality of sliders 30 by detecting the magnetic information of the tracks 34a to 34c. Further, by acquiring the magnetic information of the tracks 34d to 34f, it is possible to specify where the specified slider 30 is located with respect to the magnetic sensor 12.

Figure 6:
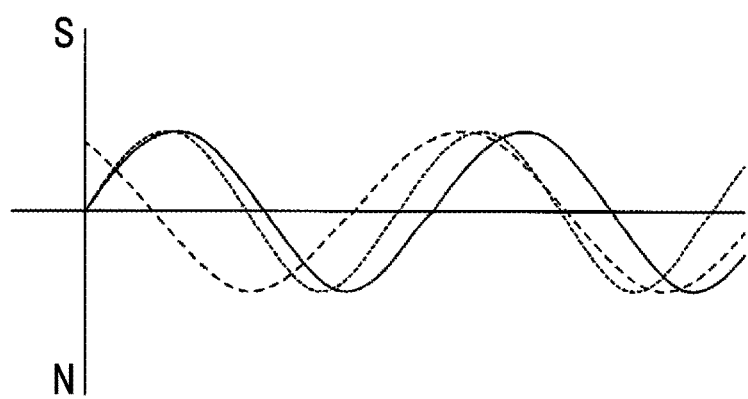
FIG. 6 is a view illustrating an example of a magnetic pattern of the magnetic scale of the conveyance device according to one embodiment of the present disclosure.

As illustrated in FIG. 6, the identification track is configured so that the nonious (vernier) track 34c and the segment track 34a have a magnetic period indicating a constant phase difference at a different period (pitch) based on the track 34b which is a master.

The magnetic scale 34 includes the tracks 34b and 34c on which predetermined magnetic information is periodically and repeatedly recorded, and the track 34a on which periodic information of the tracks 34b and 34c is recorded. In other words, predetermined magnetic information is periodically and repeatedly recorded on the master track 34b and the nonious track 34c. In addition, the segment track 34a is recorded with information specifying which period the tracks 34b and 34c are.

Further, in the present embodiment, as illustrated in FIGS. 3 and 4, the magnetization start positions P2 and the magnetization end positions P3 of some tracks 34a of the plurality of tracks 34a to 34f are shifted to the side opposite to the end portion of the track from the magnetically unstable regions 342 of the other tracks 34b to 34f. Specifically, the magnetically unstable region 342 exists by a distance of D1 from the end portion. Moreover, the inside of the magnetically unstable region 342 becomes the magnetically stable region 341. The magnetization start position P2 and the magnetization end position P3 of the track 34a are disposed inside the magnetization start positions P1 and the magnetization end positions P4 of the tracks 34b to 34f by a distance of D2 (>D1).

Further, for the magnetic scale 34, a position (coordinates by tracks 34d to 34f (position tracks)) for determining the identification and position of the slider 30 is set, for example, on the assumption that the detection is delayed by a maximum of 1/4 period in advance. As a result, it is possible to suppress variations in determination timing for each scale.

Further, the magnetization start positions P2 and the magnetization end positions P3 of some tracks 34a of the plurality of tracks 34a to 34f are shifted to the side opposite to the end portion of the track by one period or more from the magnetization start positions P1 and the magnetization end positions P4 of the other tracks 34b to 34f. That is, the distance D2 between the magnetization start positions P1 and P2 (magnetization end positions P3 and P4) is greater than one period of the longest period of the tracks 34b to 34f.

Here, regardless of the state of the material of the magnetic scale 34, in the continuous magnetization, a portion of a period corresponding to one wavelength (one period) at the end portion is placed in an environment different from the other period (inner period). In other words, the inner period exhibits a predetermined magnetic properties after being affected by the magnetic influence of the adjacent period. However, in one period of the end portion, since there is no magnetic period on the outside, the balance is different from the inner period. Therefore, even when the same magnetization is performed in terms of magnetization setting, the magnetic field distribution will be slightly different. Therefore, by arranging the six tracks 34a to 34f and setting the position serving as a trigger for position detection at least one wavelength (one period) inside from the end portion which is the magnetization start position P1 (magnetization end position P4), magnetic properties of the other tracks 34b to 34f can be stabilized.

Further, as illustrated in FIG. 5, a distance from the magnetization start positions P2 to the magnetization end positions P3 of some tracks 34a of the plurality of tracks 34a to 34f is greater than a distance between the adjacent magnetic sensors 12. As a result, the magnetism of all the tracks 34a to 34f can be detected while one magnetic sensor 12 of the adjacent magnetic sensors 12 is in a controlled state, and the control unit 40 can start control. As a result, when the slider 30 moves while transferring between the plurality of magnetic sensors 12, it is possible to accurately detect all the positions of the slider 30. Moreover, the slider 30 will not fall into an uncontrolled state. That is, when the slider 30 moves across the plurality of magnetic sensors 12, when the next magnetic sensor 12 reaches the magnetically stable region 341 of the track 34a while feedback control is being performed based on the detection result of the previous magnetic sensor 12, it is possible to take over the control among the plurality of magnetic sensors 12 in the state of feedback control and within the magnetically stable region 341.

Moreover, the magnetization start position P2 and the magnetization end position P3 of one track 34a of the plurality of tracks 34a to 34f are shifted to the side opposite to the end portion of the track from the magnetization start positions P1 and the magnetization end positions P4 of the other plurality of tracks 34b to 34f of the plurality of tracks 34a to 34f. That is, only one track 34a is shortened.

The control unit 40 is configured to control each unit of the conveyance device 100. The control unit 40 controls the power supplied to the linear motor stator 11 to control the movement of the slider 30. The control unit 40 also controls the movement of the conveyance mechanism 20 by controlling the drive of the moving mechanism 21 of the transfer conveyance units 3 and 4. The control unit 40 includes a Central Processing Unit (CPU), memory, and the like.

Here, the control unit 40 is configured to acquire the position of the slider 30 based on the detection result of the magnetic sensor 12. Further, in a case where the position of the slider 30 is acquired by detecting the magnetism of the magnetic scale with one magnetic sensor 12, the magnetism of the magnetically stable region 341 in which the magnetic information of all tracks of the plurality of tracks 34a to 34f of the magnetic scale 34 is stable is detected by other magnetic sensor 12 adjacent to the one magnetic sensor 12, the control unit 40 is configured to start control to acquire the position of the slider 30 based on the detection result of the other magnetic sensor 12.

Specifically, the control unit 40 is configured to determine whether or not the track is the magnetically stable region 341 in which the magnetic information of the tracks 34a to 34f of the magnetic scale 34 is stable based on the presence or absence of the magnetism detected by the magnetic sensor 12.

Further, the control unit 40 is configured to determine that the other tracks 34b to 34f of the plurality of tracks 34a to 34f are the magnetically stable region 341 when the magnetism of all tracks of the plurality of tracks 34a to 34f is detected.

Further, when the other tracks 34b to 34f of the plurality of tracks 34a to 34f are the magnetically stable region 341, the control unit 40 is configured to determine whether or not some tracks 34a of the plurality of tracks 34a to 34f are the magnetically stable region 341 based on the magnetic information of the other tracks 34b to 34f.

(Position Detection Start Processing)

Position detection start processing when the magnetic sensor 12 is transferred by the control unit 40 of the conveyance device 100 will be described with reference to FIG. 7. In addition, in a case where the slider 30 is moved and the magnetic scale 34 is disposed across two adjacent magnetic sensors 12, this processing is performed when the magnetic sensor 12 that detects magnetism to acquire the identification and position of the slider 30 is transferred (switched).

In Step S1 of FIG. 7, the control unit 40 determines whether or not the magnetism of the five tracks 34b to 34f is detected by the magnetic sensor 12 of a transfer destination. The determination in Step S1 is repeated until the magnetism of the five tracks 34b to 34f is detected.

When the magnetism of the five tracks 34b to 34f is detected, in Step S2, the control unit 40 determines whether or not the magnetism of all the tracks 34a to 34f is detected. That is, in addition to the detected tracks 34b to 34f, it is determined whether or not the magnetism of the segment track 34a of the identification track is detected. The determination in Step S2 is repeated until the magnetism of all the tracks 34a to 34f is detected.

When the magnetism of all the tracks 34a to 34f is detected, in Step S3, based on the position tracks (tracks 34d to 34f), it is determined whether or not the position of the magnetic scale 34 (slider 30) moves within a predetermined range.

That is, based on the magnetic information of the position tracks (tracks 34d to 34f), it is determined whether or not the short track 34a has also become a magnetically stable region. The determination in Step S3 is repeated until the position of the magnetic scale 34 (slider 30) moves within the predetermined range.

When the position of the magnetic scale 34 (slider 30) is moved within a predetermined range, the magnetism of the identification tracks (tracks 34a to 34c) is detected to determine an ID of the slider 30 in Step S4. Then, in Step S5, position detection of the slider 30 based on the magnetic sensor 12 after the transfer is started. In this case, the position detection of the slider 30 based on the magnetic sensor 12 before the transfer ends. That is, the magnetic sensor 12 used for position detection of the slider 30 is switched. After that, the position detection start processing ends.

(Effect of Present Embodiment)

In the present embodiment, the following effects can be obtained.

In the present embodiment, as described above, the magnetization start positions P2 and the magnetization end positions P3 of some tracks 34a of the plurality of tracks 34a to 34f are shifted to the side opposite to the end portion of the track from the magnetization start positions P1 and the magnetization end positions P4 of the other tracks 34b to 34f. As a result, when the magnetic sensor 12 does not detect the magnetism of all of the plurality of tracks 34a to 34f of the magnetic scale 34, it can be determined that the magnetic scale 34 is near the end portion. Accordingly, it is possible to detect magnetic information whose information accuracy is not high (unstable) in the vicinity of the end portion of the magnetic scale 34 and to suppress use of the magnetic information for position detection of the slider 30. Further, when the magnetic sensor 12 detects the magnetism of all of the plurality of tracks 34a to 34f of the magnetic scale 34, the magnetic information of the other tracks 34b to 34f except for some tracks 34a is magnetically stable. Accordingly, it is possible to determine whether or not the magnetic information of some tracks 34a is located to be magnetically stable using the stable magnetic information of the other tracks 34b to 34f. This makes it possible to accurately determine a timing to start detecting the position of the slider 30. As a result, the position of the slider 30 can be detected with high accuracy.

Further, in the present embodiment, as described above, each of the plurality of tracks 34a to 34f includes the magnetically stable region 341 in which the magnetic information is stable, and the magnetically unstable region 342 which is disposed outside both ends of the magnetically stable region 341 and in which the magnetic information is magnetically unstable, and the magnetization start positions P2 and the magnetization end positions P3 of some tracks 34a of the plurality of tracks 34a to 34f are shifted to the side opposite to the end portion of the track from the magnetically unstable regions 342 of the other tracks 34b to 34f. As a result, when the magnetism of all of the plurality of tracks 34a to 34f including some tracks 34a shifted to the side opposite to the end portion of the track is detected, the other tracks 34b to 34f are the magnetically stable region 341. Therefore, magnetic information with high information accuracy can be detected from the other tracks 34b to 34f based on detection of all of the plurality of tracks 34a to 34f. As a result, it is possible to accurately determine whether or not the magnetic information of some tracks 34a is at the magnetically stable position by using the stable magnetic information of other tracks 34b to 34f.

Further, in the present embodiment, as described above, each of the plurality of tracks 34a to 34f is configured such that magnetism changes periodically, and the magnetization start positions P2 and the magnetization end positions P3 of some tracks 34a of the plurality of tracks 34a to 34f are shifted to the side opposite to the end portion of the track by one period or more from the magnetization start positions P1 and the magnetization end positions P4 of the other tracks 34b to 34f. As a result, the magnetic information is magnetically stable at a position shifted to the side opposite to the end portion of the track by one period or more from the magnetization start or the magnetization end. Accordingly, when the magnetism of all of the plurality of tracks 34a to 34f including some tracks 34a shifted to the side opposite to the end portion of the track is detected, the other tracks 34b to 34f can be reliably made into the magnetically stable region 341.

Further, in the present embodiment, as described above, a plurality of the magnetic sensors 12 are disposed along the predetermined direction, and a distance from the magnetization start positions P2 to the magnetization end positions P3 of some tracks 34a of the plurality of tracks 34a to 34f is greater than a distance between adjacent magnetic sensors 12. As a result, the magnetism of all of the plurality of tracks 34a to 34f can be detected by any one magnetic sensor 12 of the adjacent magnetic sensors 12. Accordingly, when the slider 30 moves while transferring the plurality of magnetic sensors 12, the slider 30 can be accurately detected at all positions.

Further, in the present embodiment, as described above, the magnetization start position P2 and the magnetization end position P3 of one track 34a of the plurality of tracks 34a to 34f are shifted to the side opposite to the end portion of the track from magnetization start positions P1 and magnetization end positions P4 of a plurality of other tracks 34b to 34f of the plurality of tracks 34a to 34f. As a result, it is possible to minimize the number of tracks in which the magnetization start position and the magnetization end position are shifted to the side opposite to the end portion of the track. Therefore, it is possible to increase the number of the plurality of other tracks 34b to 34f in which the magnetic information is stabilized at a position close to the end portion of the magnetic scale 34.

Further, in the present embodiment, as described above, the magnetic scale 34 includes an identification track having identification information for distinguishing the plurality of sliders 30 and a position track for specifying the position of the slider, and some tracks 34a of which the magnetization start positions and magnetization end positions are shifted to the side opposite to the end portion of the track are included in the identification track. Accordingly, when the magnetic sensor 12 detects the magnetism of all of the plurality of tracks 34a to 34f of the magnetic scale 34, the magnetic information of the position track for specifying the position of the slider 30 is magnetically stable. Accordingly, it is possible to accurately determine whether or not the magnetic information of some tracks 34a is at a position where the magnetic information is magnetically stable using the stable magnetic information of the position track.

In the present embodiment, as described above, the magnetic scale 34 includes the tracks 34b and 34c on which predetermined magnetic information is periodically and repeatedly recorded, and the track 34a on which periodic information of the tracks 34b and 34c is recorded, and the magnetization start position P2 and the magnetization end position P3 of the track 34a are shifted to the side opposite to the end portion of the track from the magnetization start positions P1 and the magnetization end positions P4 of the tracks 34b and 34c. As a result, in the tracks 34b and 34c which requires more information accuracy than the track 34a in order to accurately detect the position of the slider 30, the magnetic information can be stable at a position close to the end portion of the magnetic scale 34.

Further, in the present embodiment, as described above, the conveyance device further includes a control unit 40 that acquires the position of the slider 30 based on the detection result of the magnetic sensor 12, the plurality of magnetic sensors are disposed along the predetermined direction, and the control unit 40 is configured to start control to acquire the position of the slider 30 based on a detection result of the other magnetic sensor 12, in a case where the position of the slider 30 is acquired by detecting magnetism of the magnetic scale with one magnetic sensor 12, when the magnetism of the magnetically stable region 341 in which magnetic information of all tracks of the plurality of tracks 34a to 34f of the magnetic scale 34 is stable is detected by the other magnetic sensor 12 adjacent to the one magnetic sensor 12. As a result, it is possible to transfer from one magnetic sensor 12 to the other magnetic sensor 12 while the magnetic information of the tracks 34a to 34f detected by the other magnetic sensor 12 is magnetically stable.

Further, in the present embodiment, as described above, the control unit 40 is configured to determine whether or not the track of the magnetic scale is the magnetically stable region 341 in which the magnetic information of the tracks 34a to 34f of the magnetic scale 34 is magnetically stable based on presence or absence of the magnetism detected by the magnetic sensor 12. As a result, it is possible to determine the presence or absence of the detection of the magnetism even when the magnetic information is not stable, and thus, it is possible to accurately determine whether or not the tracks 34a to 34f of the magnetic scale 34 are the magnetically stable region 341.

Further, in the present embodiment, as described above, the control unit 40 is configured to determine that the other tracks 34b to 34f of the plurality of tracks 34a to 34f are the magnetically stable region 341 when the magnetism of all the tracks of the plurality of tracks 34a to 34f is detected. As a result, it is possible to accurately determine that the other tracks 34b to 34f longer than some tracks 34a of the plurality of tracks 34a to 34f are magnetically stable region 341.

Further, in the present embodiment, as described above, the control unit 40 is configured to determine whether or not some tracks 34a of the plurality of tracks 34a to 34f are the magnetically stable region 341 based on the magnetic information of the other tracks 34b to 34f when the other tracks 34b to 34f of the plurality of tracks 34a to 34f are the magnetically stable region 341. As a result, based on the magnetic information of the other tracks 34b to 34f that have previously become the magnetically stable region 341, it is determined with high accuracy that some tracks 34a shorter than the other tracks 34b to 34f have become the magnetically stable region 341.

Modification Example

It should be noted that the above-disclosed embodiment is exemplary in all respects and is not considered to be restrictive. A scope of the present disclosure is illustrated by claims rather than the descriptions of the above-described embodiment, and further includes all modifications (modification examples) within the meaning and scope equivalent to the claims.

For example, in the above embodiment, the example of the configuration in which the magnetic scale includes six tracks is illustrated, but the present disclosure is not limited to this. In the present disclosure, the magnetic scale may include a plurality of tracks other than six.

Further, in the above embodiment, an example of the configuration is described, in which the magnetization start position and the magnetization end position of one track of the plurality of tracks of the magnetic scale are shifted to the side opposite to the end portion of the track from the other tracks, but the present disclosure is not limited to this. In the present disclosure, the magnetization start positions and the magnetization end positions of two or more tracks of the plurality of tracks of the magnetic scale may be shifted to the side opposite to the end portion of the track from the other tracks.

Further, in the above embodiment, an example of the configuration is described, in which three tracks of the plurality of tracks of the magnetic scale are the identification tracks for distinguishing the slider, and the remaining three tracks are the position tracks for specifying the position of the slider, but the present disclosure is not limited to this. In the present disclosure, a plurality of identification tracks other than three may be provided, and a plurality of position tracks other than three may be provided.

Further, in the above-described embodiment, an example of a configuration in which the conveyance unit moves the slider by a linear motor is described, but the present disclosure is not limited to this. In the present disclosure, the conveyance unit may be configured to move the slider by a ball screw mechanism, a rotating belt mechanism, or the like.

Moreover, in the embodiment, an example of the configuration in which the magnetic scale has illustrated the example of the structure disposed upright in a vertical direction is described, but the present disclosure is not limited to this. In the present disclosure, the magnetic scale may be laid down in a horizontal direction.

Further, in the above-described embodiment, an example in which the conveyance unit is configured to extend linearly is illustrated, but the present disclosure is not limited to this. In the present disclosure, the conveyance unit may be curved.

Further, in the above embodiment, for convenience of illustration, the control processing of the control unit are described using a flow-driven flowchart in which the control processing of the control unit is sequentially processed along the processing flow, but the present disclosure is not limited to this. In the present disclosure, the control processing of the control unit may be performed by event-driven processing that executes processing in event units. In this case, the control processing may be completely performed by the event-driven processing, or may be performed by a combination of the event-driven processing and flow-driven processing.

What is claimed is:

1. A conveyance device comprising:
   a slider;
   a conveyance unit configured to move the slider along a predetermined direction;
   a magnetic scale that is in the slider to extend along the predetermined direction and is configured to detect a position of the slider; and
   a magnetic sensor that is in the conveyance unit and is configured to detect magnetism of the magnetic scale,
   wherein the magnetic scale includes a plurality of tracks arranged in parallel along a direction perpendicular to the predetermined direction,
   magnetization start positions and magnetization end positions of some of the plurality of tracks are shifted inward relative to the magnetization start positions and magnetization end positions of other of the plurality of tracks,
   each of the plurality of tracks includes a magnetically stable region in which magnetic information is magnetically stable and in which a phase difference is constant among the plurality of tracks, and a magnetically unstable region which is disposed outside both ends of the magnetically stable region, in which the magnetic information is magnetically unstable, and in which a phase difference is not constant among the plurality of tracks, and
   the magnetization start positions and the magnetization end positions of the some of the plurality of tracks are shifted inward relative to the magnetically unstable regions of the other of the plurality of tracks.

2. The conveyance device according to claim 1, wherein
   each of the plurality of tracks is configured such that the magnetism changes periodically, and
   the magnetization start positions and the magnetization end positions of the some of the plurality of tracks are shifted inward by one period or more from the magnetization start positions and the magnetization end positions of the other of the plurality of tracks.

3. The conveyance device according to claim 1, wherein
   a plurality of the magnetic sensors are disposed along the predetermined direction, and
   a distance from the magnetization start positions to the magnetization end positions of the some of the plurality of tracks is greater than a distance between adjacent magnetic sensors.

4. The conveyance device according to claim 1, wherein
   a magnetization start position and a magnetization end position of one of the plurality of tracks are shifted inward relative to the magnetization start positions and magnetization end positions of a plurality of the other of the plurality of tracks.

5. The conveyance device according to claim 1, wherein
the magnetic scale includes an identification track having identification information for distinguishing a plurality of the sliders and a position track for specifying the position of the slider, and
the some of the plurality of tracks of which the magnetization start positions and magnetization end positions are shifted inward are included in the identification track.

6. The conveyance device according to claim 1, wherein
the magnetic scale includes a first track on which predetermined magnetic information is periodically and repeatedly recorded, and a second track on which periodic information of the first track is recorded, and
a magnetization start position and a magnetization end position of the second track are shifted inward relative to a magnetization start position and a magnetization end position of the first track.

7. The conveyance device according to claim 1, further comprising:
a controller configured to acquire the position of the slider based on a detection result of the magnetic sensor,
wherein a plurality of the magnetic sensors are disposed along the predetermined direction, and
the controller is configured to start control to acquire the position of the slider based on a detection result of one magnetic sensor, in a case where the position of the slider is acquired by detecting the magnetism of the magnetic scale with the other magnetic sensor, when magnetism of a magnetically stable region in which magnetic information of all tracks of the plurality of tracks of the magnetic scale is magnetically stable is detected by one magnetic sensor adjacent to the other magnetic sensor.

8. The conveyance device according to claim 7, wherein
the controller is configured to determine whether or not the track of the magnetic scale is the magnetically stable region in which the magnetic information of the track of the magnetic scale is magnetically stable based on presence or absence of the magnetism detected by the magnetic sensor.

9. The conveyance device according to claim 8, wherein
the controller is configured to determine that the other tracks of the plurality of tracks are the magnetically stable region when the magnetism of all the tracks of the plurality of tracks is detected.

10. The conveyance device according to claim 8, wherein
the controller is configured to determine whether or not the some of the plurality of tracks are the magnetically stable region based on the magnetic information of the other of the plurality of tracks when the other of the plurality of tracks are the magnetically stable region.

11. A slider position detecting device comprising:
a magnetic scale that is provided in a slider, which is configured to move along a predetermined direction, to extend along the predetermined direction and detect a position of the slider; and
a magnetic sensor that is provided in a conveyance unit that is configured to move the slider along the predetermined direction and detects magnetism of the magnetic scale,
wherein the magnetic scale includes a plurality of tracks arranged in parallel along a direction perpendicular to the predetermined direction,
magnetization start positions and magnetization end positions of some of the plurality of tracks are shifted inward relative to the magnetization start positions and magnetization end positions of other of the plurality of tracks,
each of the plurality of tracks includes a magnetically stable region in which magnetic information is magnetically stable and in which a phase difference is constant among the plurality of tracks, and a magnetically unstable region which is disposed outside both ends of the magnetically stable region, in which the magnetic information is magnetically unstable, and in which a phase difference is not constant among the plurality of tracks, and
the magnetization start positions and the magnetization end positions of the some of the plurality of tracks are shifted inward relative to the magnetically unstable regions of the other of the plurality of tracks.

12. The conveyance device according to claim 2, wherein
a plurality of the magnetic sensors are disposed along the predetermined direction, and
a distance from the magnetization start positions to the magnetization end positions of the some of the plurality of tracks is greater than a distance between adjacent magnetic sensors.

13. The conveyance device according to claim 2, wherein
a magnetization start position and a magnetization end position of one of the plurality of tracks are shifted inward relative to the magnetization start positions and magnetization end positions of a plurality of the other of the plurality of tracks.

14. The conveyance device according to claim 9, wherein
the controller is configured to determine whether or not the some of the plurality of tracks are the magnetically stable region based on the magnetic information of the other of the plurality of tracks when the other of the plurality of tracks are the magnetically stable region.

* * * * *